US010067291B2

(12) United States Patent
Durand et al.

(10) Patent No.: US 10,067,291 B2
(45) Date of Patent: Sep. 4, 2018

(54) METHOD OF MANUFACTURING A WAVEGUIDE (71) Applicant: STMicroelectronics SA, Montrouge (FR)

(72) Inventors: Cédric Durand, La Terrasse (FR); Frédéric Gianesello, Saint Alban Leysse (FR); Folly Eli Ayi-Yovo, Grenoble (FR)

(73) Assignee: STMicroelectronics SA, Montrouge (FR)

(*) Notice: Subject to any disclaimer, the term of this patent is extended or adjusted under 35 U.S.C. 154(b) by 0 days.

(21) Appl. No.: 15/499,261

(22) Filed: Apr. 27, 2017

(65) Prior Publication Data

US 2018/0106969 A1 Apr. 19, 2018

(30) Foreign Application Priority Data

Oct. 13, 2016 (FR) ...................................... 16 59923
Oct. 13, 2016 (FR) ...................................... 16 59924

(51) Int. Cl.
G02B 6/02 (2006.01)
G02B 6/30 (2006.01)
C03C 23/00 (2006.01)
B23K 26/364 (2014.01)
B23K 26/402 (2014.01)
(Continued)

(52) U.S. Cl.
CPC ............ *G02B 6/30* (2013.01); *B23K 26/0624* (2015.10); *B23K 26/364* (2015.10); *B23K 26/402* (2013.01); *C03C 23/0025* (2013.01); *B23K 2203/54* (2015.10)

(58) Field of Classification Search
CPC . G02B 6/107; G02B 6/4214; G02B 2006/121
See application file for complete search history.

(56) References Cited

U.S. PATENT DOCUMENTS 5,080,962 A * 1/1992 Hench ..................... C03C 1/006
216/24
6,477,296 B1 * 11/2002 Ogawa ................. G02B 6/4246
385/31
(Continued)

FOREIGN PATENT DOCUMENTS

EP 0445527 A2 9/1991
EP 0903596 A2 3/1999
(Continued)

OTHER PUBLICATIONS

S. Darvishi, et al., "Ultrafast laser machining of tapered microchannels in glass and PDMS", Optics and Lasers in Engineering 50 (2012), pp. 210-214.

Primary Examiner — Rhonda Peace
(74) Attorney, Agent, or Firm — Slater Matsil, LLP (57) ABSTRACT A method of manufacturing a waveguide in a glass plate is disclosed. The glass plate is scanned with a laser beam directed orthogonally to the glass plate to form a trench according to a pattern of the waveguide to be formed. The scanning is performed by pulses of the laser beam having a duration between 2 and 500 femtoseconds. The glass plate with the trench is treated with hydrofluoric acid. After treating the glass plate, the trench is filled with a material having an index different from that of glass, and, after filling the trench, a cladding layer is deposited.

21 Claims, 5 Drawing Sheets

(51) Int. Cl.
  *B23K 26/0622* (2014.01)
  *B23K 103/00* (2006.01)

(56) References Cited

U.S. PATENT DOCUMENTS

| | | | | |
|---|---|---|---|---|
| 6,573,026 | B1 * | 6/2003 | Aitken | C03C 23/0025 385/123 |
| 6,772,514 | B2 * | 8/2004 | Ogura | C03C 17/28 219/121.71 |
| 6,804,423 | B2 * | 10/2004 | Tsukamoto | G02B 6/138 385/14 |
| 6,977,137 | B2 * | 12/2005 | Borrelli | C03C 23/0025 430/321 |
| 7,411,151 | B2 * | 8/2008 | Sugioka | C03C 23/0025 219/121.68 |
| 7,438,824 | B2 * | 10/2008 | Taylor | B82Y 20/00 216/37 |
| 2002/0028045 | A1 * | 3/2002 | Yoshimura | G02B 6/10 385/50 |
| 2003/0033975 | A1 * | 2/2003 | Bazylenko | G02B 6/122 117/84 |
| 2003/0114006 | A1 * | 6/2003 | White | G02B 6/10 438/694 |
| 2003/0150839 | A1 | 8/2003 | Kobayashi et al. | |
| 2003/0235385 | A1 | 12/2003 | Taylor et al. | |
| 2004/0047561 | A1 | 3/2004 | Tuda | |
| 2005/0213916 | A1 | 9/2005 | Fukuda et al. | |
| 2006/0219676 | A1 * | 10/2006 | Taylor | B82Y 20/00 219/121.69 |
| 2009/0202713 | A1 * | 8/2009 | Pitwon | G02B 6/1221 427/163.2 |
| 2013/0323469 | A1 * | 12/2013 | Abramov | C03B 33/0222 428/155 |
| 2018/0106969 | A1 * | 4/2018 | Durand | G02B 6/30 |

FOREIGN PATENT DOCUMENTS

| | | |
|---|---|---|
| GB | 2160196 A | 12/1985 |
| JP | S60129711 A | 7/1985 |

* cited by examiner

METHOD OF MANUFACTURING A WAVEGUIDE

CROSS-REFERENCE TO RELATED APPLICATIONS

This application claims the priority benefit of French patent application number 1659923, filed on Oct. 13, 2016 and French patent application number 1659924, filed on Oct. 13, 2016, the contents of which is hereby incorporated by reference in its entirety to the maximum extent allowable by law.

TECHNICAL FIELD

The present disclosure relates to a method of manufacturing a waveguide and, in particular embodiments, a method of manufacturing a single-mode waveguide.

BACKGROUND

Optical signals may be used to transmit data, for example, by means of an optical fiber. To increase the quantity of transmitted data, it is known to transmit a plurality of optical signals of different wavelengths in a same optical fiber. Optical devices, such as that disclosed in relation with FIG. 1, enable to create a connection between an optical fiber and optical signal processing circuits.

Figure 1:
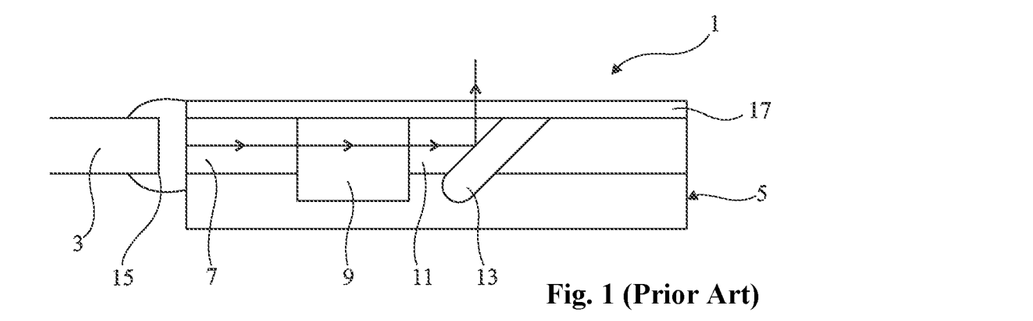
FIG. 1, previously described, illustrates an optical device.

FIG. 1 is a cross-section view of an optical device 1 transmitting optical signals from a single-mode optical fiber 3 to, for example, optical signal processing circuits, not shown in FIG. 1. Device 1 comprises a glass plate 5 forming an interposer between optical fiber 3 and, for example photonic integrated circuits, for example, made of silicon, not shown in FIG. 1. Plate 5 for example has a rectangular shape or a circular shape. Various elements are formed, for example by etching, on the upper surface of plate 5.

These elements include a waveguide 7 capable of transmitting a multiple-frequency optical signal received from a single-mode optical fiber 3. An optical signal demultiplexer 9 transmits, over waveguides 11, single-frequency optical signals obtained by frequency filtering from the multiple-frequency optical signal transmitted by waveguide 7. A mirror 13 interrupts each waveguide 11 and is capable of reflecting, to the outside of wafer 1, the optical signal transmitted by the corresponding waveguide 11.

The end of optical fiber 3 is arranged at the surface of an end of waveguide 7. An index-matching material 15 having a refraction index between that of the fiber and that of the material of waveguide 7, is preferably arranged between the end of optical fiber 3 and the end of waveguide 7. The path of an optical signal sent by the optical fiber is shown in FIG. 1 with arrows.

Waveguides 7 and 11 have the same characteristics. Waveguides 7 and 11 are made of a material having a larger index than the glass of plate 5. Waveguides 7 and 11 should have transverse dimensions close to that of a single-mode optical fiber, for example, in the range from 3 to 15 µm, for example, in the order of 7 µm. Such dimensions enable to minimize signal losses at the input of plate 5 and to do without using a coupler. Optical demultiplexer 9 is a device which separates on at least two output waveguides 11 at least two wavelengths of the optical signal of input guide 7.

Each mirror 13 is made of a material reflecting the concerned wavelengths, for example, made of metal. Mirror 13 is obliquely formed in plate 5 and forms with the propagation axis of waveguide 11 that it interrupts an angle in the order of 42 degrees. The upper surface of plate 5 may be covered with a cladding layer 17 transparent to the concerned wavelengths.

SUMMARY

To form the type of optical device described above, it is desirable to manufacture, in a glass plate, waveguides having their dimensions coinciding with those of a single-mode optical fiber. It is further desirable to be able to form inclined mirrors arranged at a desired located in the plate.

Thus, an embodiment provides a method of manufacturing a waveguide in a glass plate, comprising the successive steps of: scanning the plate with a laser beam directed orthogonally to the plate to form a trench according to the pattern of the waveguide to be formed, the duration of the pulses of this laser being in the range from 2 to 500 femtoseconds; treating with hydrofluoric acid; filling the trench with a material having an index different from that of glass; and depositing a cladding layer.

According to an embodiment, the depth of the trench is in the range from 5 to 10 µm and the width of the trench is in the range from 5 to 10 µm, which results in a single-mode waveguide.

According to an embodiment, the material is a polymer.

According to an embodiment, the filling step is followed by a crosslinking anneal step.

According to an embodiment, the filling step is followed by a planarization step.

According to an embodiment, the planarization step is carried out by chem.-mech. polishing.

According to an embodiment, the filling step is carried out by lamination.

According to an embodiment, the trench has a semi-circular, rectangular, or rounded-angle rectangular cross-section.

According to an embodiment, the laser emits pulses at a frequency in the range from 10 to 500 kHz.

According to an embodiment, the cladding layer is a silicon oxide layer.

Another embodiment provides a single-mode waveguide made of a material having an index greater than that of glass, formed in a glass plate, the waveguide having lateral dimensions and a depth in the range from 5 to 10 µm.

Another embodiment provides a method of manufacturing an optical mirror in a glass plate, comprising the successive steps of: scanning a surface of the plate with a laser beam obliquely directed with respect to said surface, to form a trench according to the pattern of the mirror to be formed, the duration of the pulses of this laser being in the range from 2 to 500 femtoseconds; treating with hydrofluoric acid; and filling the trench with a metal.

According to an embodiment, the trench is filled with metal by cathode sputtering.

According to an embodiment, the metal is copper, aluminum, or an alloy of copper and aluminum.

According to an embodiment, the method comprises a step of subsequent deposition of a cladding layer on the surface of the structure.

According to an embodiment, the cladding layer is a silicon oxide layer.

According to an embodiment, the trench has a rectangular or rounded-angle rectangular cross-section.

According to an embodiment, the angle formed between the trench and the surface of the plate is in the range from 30 to 50 degrees.

According to an embodiment, the laser emits pulses at a frequency in the range from 10 to 500 kHz.

According to an embodiment, the mirror is concave or convex.

BRIEF DESCRIPTION OF THE DRAWINGS

The foregoing and other features and advantages will be discussed in detail in the following non-limiting description of specific embodiments in connection with the accompanying drawings.

DETAILED DESCRIPTION OF ILLUSTRATIVE EMBODIMENTS

The same elements have been designated with the same reference numerals in the different drawings and, further, the various drawings are not to scale. For clarity, only those steps and elements which are useful to the understanding of the described embodiments have been shown and are detailed.

In the following description, when reference is made to terms qualifying position, such as terms "top", "upper", etc., or terms qualifying orientation such as terms "horizontal", "vertical", etc., reference is made to the orientation of the drawings. Unless otherwise specified, expressions "substantially" and "in the order of" mean to within 10%, preferably to within 5%.

To form, at a lower cost, waveguides on a glass substrate, it is known to use simple lithography equipment, that is, of low resolution, such as currently available in an electronic component assembly line. However, such equipment only enables to form single-mode waveguides having dimensions greater than approximately 50 μm. Such dimensions are much larger than the dimensions of a single-mode optical fiber, which are in the range from 5 to 10 μm.

FIGS. 2A to 2E are perspective views and cross-section views illustrating steps of an embodiment of a method of manufacturing a single-mode waveguide of transverse dimensions in the range from 5 to 10 μm, in a glass plate 30, having a thickness for example in the range from 1 to 1.5 mm. A single-mode waveguide having a form factor in the order of 1 is here considered, that is, the cross-section of the waveguide has a width-to-depth ratio in the order of 1. The cross-section of the guide may then be round, square, or square with rounded angles.

Figure 2A:
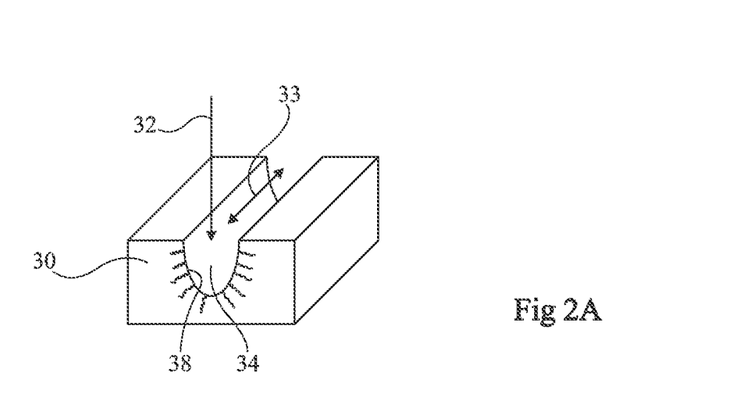
FIGS. 2A to 2F illustrate steps of an embodiment of a waveguide manufacturing method.

At the step of FIG. 2A, plate 30 is scanned with a laser beam 32. Laser beam 32 scans the surface of plate 30 according to a pattern symbolized by an arrow 33 corresponding to the pattern of the waveguide to be formed. In this case, the waveguide to be formed has a rectilinear shape. The glass of plate 30 is pulverized by beam 32 and a trench 34 is thus formed. Laser beam 32 is generated by a pulse laser, each pulse thereof having a duration in the range from 2 to 500 femto-seconds. As an example, in the glass, the trench may be obtained for pulses having energies greater than 500 nJ and a duration in the order of 100 fs. This energy is calculated according to the dimensions of the cavity which is desired to be formed with a pulse. The laser emits the pulses, for example, at a frequency in the range from 10 to 500 kHz. The laser will be called femtolaser hereafter.

An advantage of the use of a femtolaser is that the duration of the pulses is rather short as compared with the duration of thermal relaxation of the material. This property enables to accurately machine the material and thus limits thermal effects at the periphery of the ablated area. Trench 34 has a cross-section of semi-circular shape having a depth in the range from 5 to 10 μm. The width of trench 34 is smaller than the desired dimension. It can be observed that the glass of walls 36 of trench 34 has a certain roughness and has cracks across a substantially constant thickness. Such a roughness may prevent a proper operation of the waveguide.

Figure 2B:
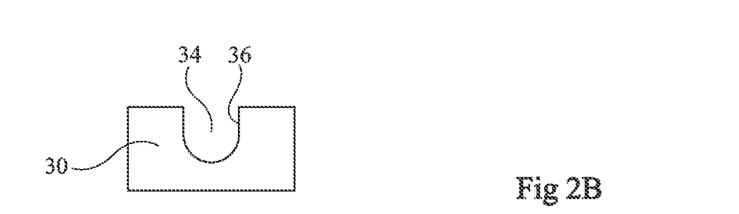

At the step of FIG. 2B, plate 30 is submitted to a hydrofluoric acid etching. The cracked glass is dissolved by the hydrofluoric acid across its entire thickness in the range from 1 to 2 μm. Accordingly, the roughness of walls 36 is decreased. The cracked glass is etched with hydrofluoric acid, preferably over non-cracked glass, so that the final shape of trench 34 has a cross-section which is substantially square shaped with rounded angles. Thus, the waveguide will have a substantially equal depth and width, in the range from 5 to 10 μm. In other words, the waveguide will have a form factor in the order of 1 and will be single-mode for the considered wavelengths, that is, in the range from 1,300 to 1,500 nm. Further, its dimensions will be adapted to those of a single-mode optical fiber.

Figure 2C:
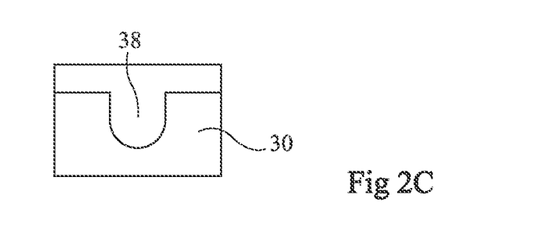

At the step of FIG. 2C, trench 34 is filled with a material 38 having a refraction index larger than the refraction index of glass. Material 38 is for example a polymer, for example, provided in the form of a stretchable dry film (that is, requiring no solvent). The index difference between the glass and material 38 is in the range from $10^{-3}$ to $10^{-2}$, for example, in the order of $5 \times 10^{-3}$. An adapted polymer material is that distributed by Elga Europe in the form of a stretchable dry film, under trade name "Ordyl SY 317". The trench is for example filled by a lamination technique. Material 38 is first deposited on the surface of the structure. Material 38 is then spread, and then laminated on the glass to have it penetrate into the trench and to obtain a planar upper surface. In the case where material 38 is a polymer, the lamination step is followed by a step of crosslinking the polymer material, for example, an anneal or an exposure to an ultraviolet radiation. Trench 34 filled with material 38 forms the core of the waveguide to be formed.

Figure 2D:
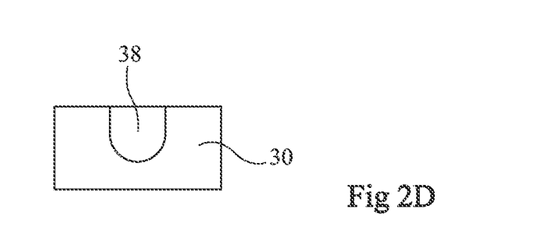

At the step of FIG. 2D, the excess material 38 has been removed from the surface of the structure, for example, by polishing. The polishing is for example a chem.-mech. polishing or CMP step. The polishing further enables to smooth possible roughnesses of the upper surface of material 38.

Figure 2E:
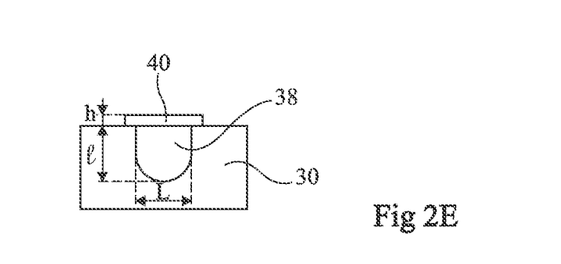

FIG. 2E illustrates an alternative embodiment of the step of FIG. 2D, where a layer 40 of material 38 is left above the structure. The form factor of the waveguide is then equal to the ratio of width L of trench 34 to the sum of depth l of the trench and of thickness h of layer 40. In a first case, the trench has, without layer 40, a form factor in the order of 1. Layer 40 should then have a rather thin thickness to avoid altering the form factor of the waveguide. In a second case, the trench has, without layer 40, a form factor which is not equal to 1 and the thickness of layer 40 is calculated to correct this form factor so that the waveguide has a form factor in the order of 1.

Figure 2F:
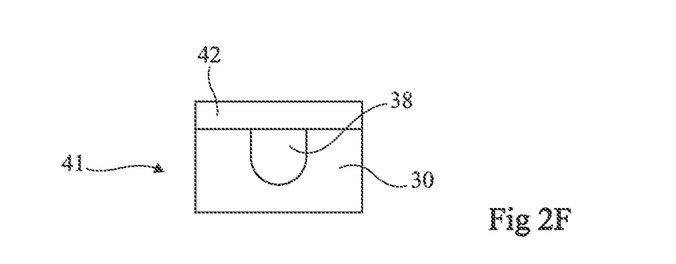

At the step of FIG. 2F, waveguide 41 is completed. A cladding layer 42 is deposited on the surface of the structure. Layer 42 is made of a material having a refraction index smaller than that of material 38. The index difference between the glass and the material of layer 42 is in the order of the index difference between the glass and material 38. Layer 42 is for example made of silicon oxide or of a polymer. Layer 42 for example has a thickness in the range from 5 to 50 µm, for example, 10 µm.

An advantage of this embodiment is that it enables to form guides having different shapes and different sizes with a femtolaser. It is possible to form curved waveguides, waveguides having different depths, or also cavities by adequately scanning the glass plate. It is further possible to form various types of optical devices such as those disclosed in relation with FIGS. 3A and 3B.

Figure 3A:
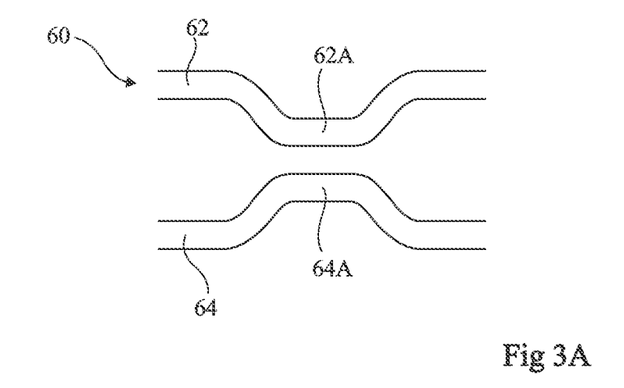
FIGS. 3A and 3B illustrate various optical devices.

FIG. 3A is a top view of an optical device 60 formed according to the manufacturing method disclosed in relation with FIGS. 2A to 2F. Device 60 is a directional optical coupler. Device 60 comprises two waveguides 62 and 64 and has two inputs and two outputs. A portion 62A of waveguide 62 and a portion 64A of the waveguide are parallel. Portions 62A, 64A are arranged so that portion 62A, respectively 64A, can receive an evanescent wave created by an optical signal propagating in the other portion 64A, respectively 62A. The luminous power of the signal propagating in portion 62A, respectively 64A, is progressively transmitted into portion 64A, respectively 62A. The coupling depends on the distance between portions 62A and 64A and on their length. Device 60 may be used indifferently in both directions of light. This device can be used as a biasing power splitter or combiner. To form device 60, a laser beam originating from a femtolaser scans a glass plate according to the patterns of waveguides 62 and 64.

Figure 3B:
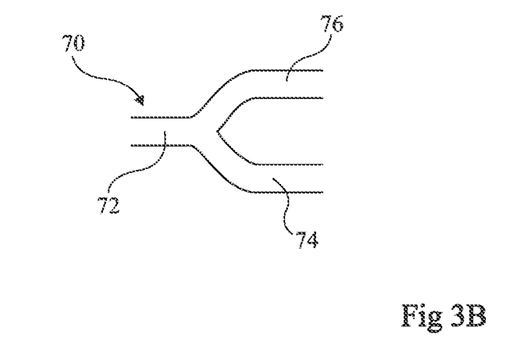

FIG. 3B is a top view of an optical device 70 formed according to the manufacturing method disclosed in relation with FIGS. 2A to 2F. Device 70 is an optical power splitter, currently called Y junction. Device 70 comprises an input waveguide 72 and two output waveguides 74 and 76. Input waveguide 72 and output waveguides 74, 76 form a fork which splits an optical input signal transmitted by input waveguide 72 into two output optical signals each transmitted over one of output waveguides 74 or 76. It is further possible to use device 70 in an opposite direction where output waveguides 74 and 76 are input waveguides and input waveguide 72 is an output waveguide. In this case, device 50 is an optical power combiner. To form device 70, a laser beam originating from a femtolaser scans a glass plate according to the patterns of waveguides 72, 74, and 76.

Of course, other passive optical devices comprising waveguides and resonant cavities may be formed according to the manufacturing method described in relation with FIGS. 2A to 2F.

To form inclined optical mirrors in a glass plate, it is known to file down the edge of a glass plate to obtain an inclined wall. The wall is then covered with a reflective material, for example, with a metal. A disadvantage of this method is that it is not possible to form inclined optical mirrors in another place than at the edge of a plate.

Figure 4A:
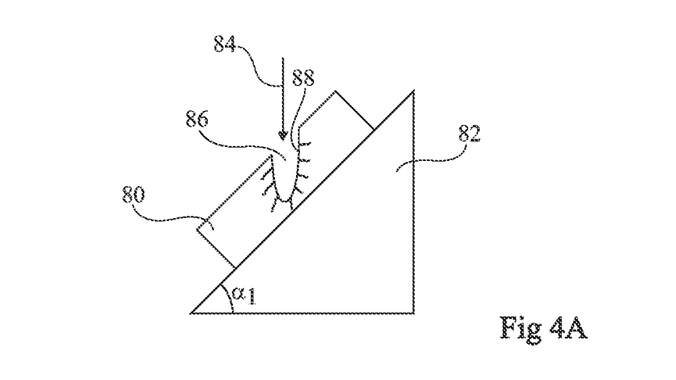
FIGS. 4A to 4C illustrate steps of an embodiment of an optical mirror manufacturing method.
Figure 4B:
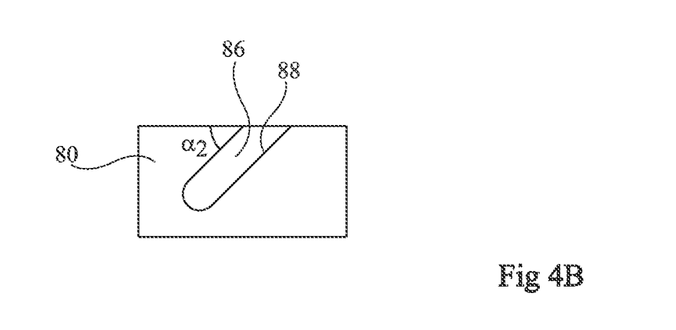
Figure 4C:
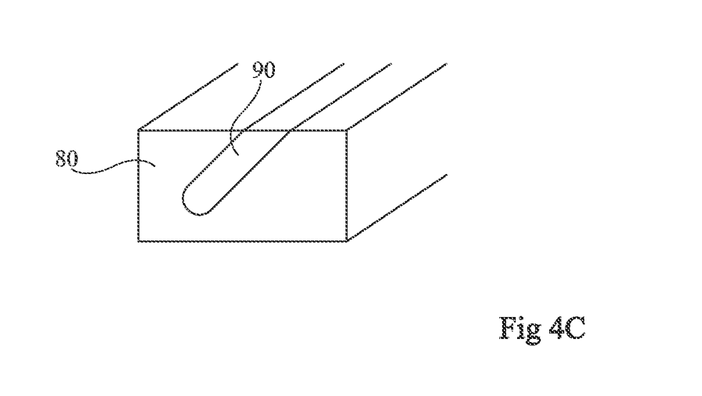

FIGS. 4A to 4C are a perspective view and cross-section views illustrating an embodiment of a method of manufacturing an inclined optical mirror in a glass plate 80.

At the step of FIG. 4A, plate 80 is positioned on a support enabling to incline it by an angle $\alpha_1$ with respect to the horizontal direction. Angle $\alpha_1$ is, for example, in the range from 30 to 50 degrees, for example, in the order of 35 degrees. A vertical laser beam 84 scans plate 80 by following the pattern of the mirror and forms a trench 86. Laser beam 84 is generated by a femtolaser, having its advantages disclosed in relation with FIG. 2A. Laser beam 84 is capable of generating for each pulse a cavity of cylindrical shape having a semi-spherical bottom. Trench 86 thus has a cross-section with a rounded bottom. It can be observed that the glass of walls 83 of trench 86 exhibits a certain roughness and has cracks across a substantially constant thickness. This roughness may prevent the proper operation of the optical mirror.

At the step of FIG. 4B, plate 80 is submitted to an etching with hydrofluoric acid of the same type as that disclosed in relation with FIG. 2B. The cracked glass is dissolved with hydrofluoric acid across its entire thickness in the range from 1 to 2 µm. Thus, the roughness of walls 88 is decreased. Trench 86 keeps its shape but slightly widens. Trench 86 is inclined with respect to the plate by an angle $\alpha_2$. Angles $\alpha_1$ and $\alpha_2$ are complementary.

At the step of FIG. 4C, trench 86 is filled with a reflective material 90. Trench 86 is for example filled by spraying. Reflective material 90 is for example a metal, for example, copper, aluminum, or an alloy of copper and aluminum, for example, deposited by cathode sputtering or PVD (physical vapor deposition). The excess reflective material 90, deposited on the surface of the structure, is for example removed by etching or by chem.-mech. polishing. The surface of material 90 deposited in trench 86 is further planarized by the same method.

An optional step of depositing a protection layer on the upper surface of the structure, similar to the step disclosed in relation with FIG. 2F, may complete this method. The protection layer has the same index as the glass and for example silicon oxide.

An advantage of this embodiment is to enable to form one or a plurality of optical mirrors directly at the desired location on a glass plate.

A planar mirror formed in a straight trench has been shown in FIG. 4C. An advantage of this embodiment is to be able to form curved trenches in the glass plate. Concave or convex mirrors would then be formed in this case.

Figure 5:
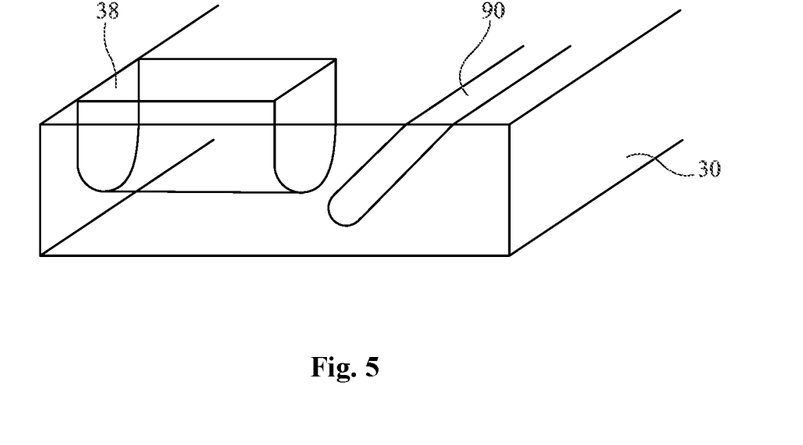
FIG. 5 illustrates an embodiment optical device.

It is possible to combine the methods described in relation with FIGS. 2A to 2F and FIGS. 4A to 4C to form an optical device of the type disclosed in relation with FIG. 1 as shown in FIG. 5. As an example, the following successive steps may be carried out:

forming the trenches intended to form the waveguides;

filling the trenches with the adequate material to form the core of the waveguides;

forming the trenches intended to form the mirrors, these trenches being deeper than the trenches intended to form the waveguides;

filling the trenches with a reflective material; and depositing a cladding layer on the surface of the structure.

The cores of the waveguides will not be damaged during the forming of the trenches intended to form the mirrors since the femtolaser has negligible thermal effects.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of manufacturing a waveguide in a glass plate, the method comprising:

scanning the glass plate with a laser beam directed orthogonally to the glass plate to form a trench according to a pattern of the waveguide to be formed, the scanning being performed by pulses of the laser beam having a duration between 2 and 500 femtoseconds, wherein the scan of the laser beam according to the pattern forms exactly one trench in the glass plate, wherein scanning the glass plate comprises forming cracks in sidewalls of the trench;

treating the glass plate with the trench with hydrofluoric acid to remove the cracks in the sidewalls of the trench;

after treating the glass plate, filling the trench with a material having an index different from that of glass; and after filling the trench, depositing a cladding layer.

2. The method of claim 1, wherein the trench has a depth between 5 μm and 10 μm and a width between 5 μm and 10 μm.

3. The method of claim 1, wherein the filled trench is a single-mode waveguide.

4. The method of claim 1, wherein the material is a polymer.

5. The method of claim 4, further comprising performing a cross-linking and after filling the trench.

6. The method of claim 1, further comprising performing a planarization step after filling the trench.

7. The method of claim 6, wherein the planarization step is carried out by chemical-mechanical polishing.

8. The method of claim 1, wherein filling the trench with the material comprises laminating the material in the trench.

9. The method of claim 1, wherein the trench has a semi-circular, rectangular, or rounded-angle rectangular cross-section.

10. The method of claim 1, wherein the pulses are emitted at a frequency between 10 and 500 kHz.

11. The method of claim 1, wherein the cladding layer comprises silicon oxide.

12. The method of claim 1, wherein the cracks extend from the sidewalls into the glass plate, and wherein the cracks extend parallel to the pattern of the waveguide.

13. The method of claim 1, wherein the cladding layer directly contacts the material in the filled trench.

14. A method of manufacturing an optical device, the method comprising:
scanning a glass plate with a first laser beam directed orthogonally to a first surface of the glass plate to form a trench according to a pattern of a waveguide to be formed, the scanning being performed by pulses of the first laser beam having a duration between 2 and 500 femtoseconds;

treating the glass plate with the trench with hydrofluoric acid;

filling the treated trench with a fill material having an index different from that of glass;

scanning the glass plate with a second laser beam directed at an acute angle with respect to the first surface to form a mirror trench in the glass plate, the mirror trench being deeper than the filled trench, wherein scanning the glass plate with the second laser beam comprises pulses of the second laser beam having a duration between 2 and 500 femtoseconds;

filling the mirror trench with a reflective material; and depositing a cladding layer over the filled trench and mirror trench.

15. The method of claim 14, wherein the filled trench has a depth between 5 μm and 10 μm and a width between 5 μm and 10 μm.

16. The method of claim 14, wherein the fill material is a polymer.

17. The method of claim 14, further comprising performing a chemical-mechanical polishing step to planarize the trench.

18. An apparatus comprising:
a glass plate;
a cladding layer disposed on a first surface of the glass plate;
a single-mode waveguide extending from the cladding layer into the glass plate, the waveguide being made of a material having an index greater than that of glass, wherein the waveguide comprises a depth between 5 μm and 10 μm and a width between 5 μm and 10 μm; and
an inclined mirror extending from the cladding layer into the glass plate and terminating in the glass plate, the inclined mirror forming an acute angle with the first surface, wherein the inclined mirror is disposed entirely within the glass plate.

19. The apparatus of claim 18, wherein the material is a polymer.

20. The apparatus of claim 18, wherein the waveguide is disposed in a trench of the glass plate, the trench having a semi-circular, rectangular, or rounded-angle rectangular cross-section.

21. The apparatus of claim 18, wherein the cladding layer comprises silicon oxide.

\* \* \* \* \*